United States Patent
Cobb (10) Patent No.: US 7,512,935 B1
(45) Date of Patent: Mar. 31, 2009

(54) ADDING FUNCTIONALITY TO EXISTING CODE AT EXITS

(75) Inventor: Jeffrey R. Cobb, San Carlos, CA (US)

(73) Assignee: Computer Associates Think, Inc., Islandia, NY (US)

( * ) Notice: Subject to any disclaimer, the term of this patent is extended or adjusted under 35 U.S.C. 154(b) by 773 days.

(21) Appl. No.: 09/795,901

(22) Filed: Feb. 28, 2001

(51) Int. Cl.
*G06F 9/44* (2006.01)
*G06F 9/45* (2006.01)

(52) U.S. Cl. .................... 717/130; 717/158

(58) Field of Classification Search ............ 717/130.11, 717/118.127, 147.11, 159.14, 130, 158
See application file for complete search history.

(56) References Cited

U.S. PATENT DOCUMENTS

| | | | |
|---|---|---|---|
| 5,265,254 A | 11/1993 | Blasciak et al. | |
| 5,628,016 A * | 5/1997 | Kukol | 717/140 |
| 5,655,081 A | 8/1997 | Bonnell et al. | |
| 5,740,441 A * | 4/1998 | Yellin et al. | 717/134 |
| 5,778,233 A | 7/1998 | Besaw et al. | |
| 5,898,873 A | 4/1999 | Lehr | |
| 5,978,594 A | 11/1999 | Bonnell et al. | |
| 6,021,272 A * | 2/2000 | Cahill et al. | 717/147 |
| 6,026,236 A * | 2/2000 | Fortin et al. | 717/127 |
| 6,026,237 A * | 2/2000 | Berry et al. | 717/130 |
| 6,079,032 A * | 6/2000 | Peri | 714/38 |
| 6,088,525 A * | 7/2000 | Peri | 717/150 |
| 6,113,651 A | 9/2000 | Sakai et al. | |
| 6,131,187 A * | 10/2000 | Chow et al. | 717/106 |
| 6,223,339 B1 * | 4/2001 | Shah et al. | 717/158 |
| 6,247,171 B1 * | 6/2001 | Yellin et al. | 717/126 |
| 6,260,187 B1 * | 7/2001 | Cirne | 717/110 |
| 6,263,491 B1 * | 7/2001 | Hunt | 717/130 |
| 6,314,558 B1 * | 11/2001 | Angel et al. | 717/118 |
| 6,332,212 B1 | 12/2001 | Organ et al. | |
| 6,351,843 B1 * | 2/2002 | Berkley et al. | 717/128 |
| 6,662,359 B1 * | 12/2003 | Berry et al. | 717/130 |
| 6,678,883 B1 * | 1/2004 | Berry et al. | 717/128 |
| 6,728,955 B1 * | 4/2004 | Berry et al. | 717/158 |
| 6,817,014 B2 * | 11/2004 | Hundt et al. | 717/159 |
| 7,080,363 B2 * | 7/2006 | Yellin et al. | 717/139 |
| 2002/0049963 A1 * | 4/2002 | Beck et al. | 717/130 |
| 2004/0025145 A1 * | 2/2004 | Dawson | 717/129 |

OTHER PUBLICATIONS

Venners, "Try-finally Clauses Defined and Demonstrated," 1997.*
The Java™ Virtual Machine Specification, by Lindholm and Yellin, 1997.

* cited by examiner

*Primary Examiner*—Insun Kang
(74) *Attorney, Agent, or Firm*—Vierra Magen Marcus & DeNiro LLP

(57) ABSTRACT

New code is added to existing object code in order to add new functionality. For example, a call to start a profiler function can be added at the beginning of a Java method and a call to stop the profiler function can be added at the exits of the Java method. A method may have many different exits. To insure that the profiler process is stopped regardless of which exit is performed, the byte code and exception table are modified.

71 Claims, 4 Drawing Sheets

ADDING FUNCTIONALITY TO EXISTING CODE AT EXITS

BACKGROUND OF THE INVENTION

1. Field of the Invention

The present invention is directed to technology for adding functionality to existing code at exits.

2. Description of the Related Art

Performance profiling (or analysis) tools are popular tools used to debug software and to analyze an application's run time execution. Many performance profiling tools provide timing data on how long each method (or procedure or other process) is being executed, report how many times each method is executed and/or identify the function call architecture. Other functions can also be performed by various performance profiling tools. Some of the tools provide their results in text files or on a monitor. Other tools graphically display their results.

Many performance analysis tools perform their intended function by either instrumenting source code or instrumenting object code. Object code can be generated by a compiler or an assembler. Alternatively, object code can be generated manually. Object code can be machine executable or suitable for processing to produce executable machine code.

Instrumenting source code involves adding new instructions to source code and/or modifying existing instructions in the source code. Instrumenting object code includes adding new instructions to the object code and/or modifying existing instructions in the object code. Instrumenting object code does not involve accessing the source code. An example of instrumenting object code can be found in U.S. patent application Ser. No. 09/137,666, filed on Aug. 20, 1998, by Lewis K. Cirne, incorporated herein by reference.

One problem with instrumenting source code to provide performance profiling is that the source code may not be available. Thus, many performance profiling tools will add the performance profiling functionality by instrumenting the object code.

One difficulty in instrumenting code is that a method (or other set of instructions) may include many exits. Consider the following code for a method called "isNegative" which returns a Boolean value indicating whether a parameter is negative:

```
Boolean isNegative (int x)
{
if (x<0)
    return true;
   else return false;
}
```

The above method includes at least two exit points. If the parameter x is less than 0, then the method exists at the "return true" instruction. If the parameter x is not less than 0, then the method exists at the "return false" instruction. Prior art systems that add performance profiling functionality will add new code to each of the exits in the code. For example, code will be added to the return clause and the else clause of the code above.

Adding performance profiling code to each of the instructions that each can be an exit has its drawbacks. First, the same code may be added in several places which can significantly increase the amount of code in an application. A significant increase in code may impact the performance of the application and increase the chance of adding an error to the application. Additionally, the greater the number of exits, the greater chance that the system adding performance profiling code will miss one of the exits. Finally, not all of the exits are explicitly stated in the code. For example, there can be errors or exceptions. When an error or an exception occurs, the normal flow of the method can be halted, in which case none of the explicit exits will be performed and an exit associated with the error or exception will be performed. Previous performance profiling tools have not adequately accounted for all the possible exits in the software.

Therefore, what is needed is a system for adding performance profiling functionality to object code such that the new functionality is provided for all (or almost all) exits of the method (or other set of code). This need extends beyond just performance profiling tools. Thus, there is a need to add functionality to existing object code at the exits for a particular method (or other set of code) under consideration.

SUMMARY OF THE INVENTION

The present invention, roughly described, provides for a system for adding functionality to existing object code. The functionality is added so that multiple exits are accounted for. That is, if a method has multiple exists, and it is desired that the added functionality includes some type of action at each of the exits, then code is added to the existing object code such that the relevant action is performed at each of the exits.

In one embodiment, new code is added to existing object code to add the new functionality. For example, a call to start a profile action can be added at the beginning of a method and calls to stop the profile action can be added at the various exits of the method. A method may have many exits. The new code is added to insure that the profile action is stopped regardless of which of the exits is performed. In one embodiment using Java byte code, the byte code for a method and the method's exception table can be modified to implement the functions of the source code statements "try" and "finally."

In one implementation, the method of the present invention comprises the steps of adding exit code to the existing object code and adding an entry to an exceptions data store pointing to the exit code. One alternative also includes adding start code to the existing object code; however, some embodiments do not add start code. The start code, the exit code and the entry into the exceptions data store are used to add the additional functionality. The additional functionality can be any functionality desired to be added to the existing object code. One example is to add performance profiling functionality.

In one embodiment, the start code starts an action and the exit code stops the action. The start code is positioned to be executed previous to the original byte code and the exit code is positioned to be executed subsequent to the original byte code. The step of adding exit code includes adding an instruction to jump to the exit code from the original byte code. In one implementation, the step of adding an entry in the exceptions data store includes adding a new entry into an exceptions table for that method. The new entry indicates a range of indices of byte code, reference to the exit code and an indication that the entry pertains to all types of exceptions. In one implementation, the method described above is implemented using the Java programming language.

The present invention can be implemented using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, special purpose computers and programmed general computers. Hardware that can be used for the present invention includes computers, handheld devices, telephones (e.g. cellular, Internet enabled, etc.), two-way pagers, etc. Some of these hardware devices include processors, memory, nonvolatile storage, input devices and output devices.

These and other objects and advantages of the present invention will appear more clearly from the following description in which the preferred embodiment of the invention has been set forth in conjunction with the drawings.

DETAILED DESCRIPTION

Figure 1:
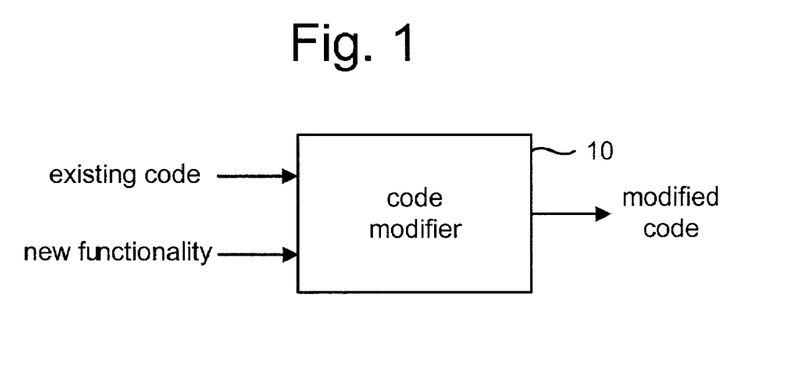
FIG. 1 is a block diagram depicting one embodiment of the code modifier of the present invention.

FIG. 1 depicts code modifier 10 of the present invention. Code modifier 10 includes at least two inputs and one output. The two inputs include existing object code and new functionality. The new functionality depicted in FIG. 1 can include additional methods, classes, instructions, etc. that add new functionality to the existing object code. In one embodiment, the new functionality implements a performance profiling tool. The output of code modifier 10 is the modified code. In one embodiment, the modified code includes a combination of the existing object code and the new functionality, with some subset of the existing object code being edited. One implementation of the present invention operates on Java code. For example purposes, the remaining portions of this document provide examples using Java code. However, the present invention applies to other programming languages and formats as well. The examples below make use of the term "method," which has a specific meaning in reference to the Java programming language. For purposes of this document, "method" includes a Java method as well as other sets of instructions such as procedures, functions, routines, subroutines, sequences, etc.

In one embodiment of the present invention, new functionality is added to a method such that all or part of the new functionality is executed upon exit from the method. Rather than add many copies of the exit code in different places, the present invention adds exit code using "try" and "finally" functionality. Consider the following example pseudo code for a method called "foo" that includes a set of Java instructions:

```
public foo( )
{
  [Java instructions]
}
```

For example purposes, assume that a user wishes to add a profiling function to the method so that the user can determine how time elapses while the method is being performed. To do this, code has to be inserted into the method to start a timer and code has to be inserted into the method to stop the timer. After the timer is stopped, the amount of time measured will be reported to the user. The present invention, conceptually, adds code to the above method foo( ) as follows:

```
public foo( )
{
  start code;
  try {
    [Java instructions]
  } finally
  {
    stop code
  }
}
```

As can be seen, new instructions represented by "start code" have been added to start the profiling function (e.g., start the timer). Additionally new code called "stop code" has been added that stops the profiling function. Rather than physically insert copies of the stop code at every possible explicit exit, the present invention conceptually encloses the [Java instructions] within a "try" block and places the stop code within a "finally" block. This implementation provides that the stop code will be performed regardless of the exit from the "try" block, including intentional exits and exceptions. Note that the "profiling function" can be a method, procedure, function, routine, subroutine, or any other set of code to implement profiling.

Many kinds of errors can cause exceptions. They range from serious hardware errors, such as a hard disk crash, to simple programming errors, such as trying to access an out-of-bounds array element. When such an error occurs within a Java method, the method creates an exception object and hands it off to the run time system. The exception object contains the information about the error, including its type and, possibly, the state of the program when the error occurred. The run time system is then responsible for finding some code to handle the error. In Java terminology, creating an exception object and handing it to the run time system is called throwing an exception.

After a method throws an exception, the run time system attempts to find something to handle the exception. The set of possible "somethings" to handle the exception is the set of methods in the call stack of the method where the error occurred. The run time system searches backwards through the call stack, beginning with the method in which the error occurred, until it finds a method that contains an appropriate exception handler. An exception handler is considered appropriate if the type of exception thrown is the same type as the type of exception handled by the handler. The exception bubbles up through the call stack until an appropriate handler is found and one of the calling methods handles the exception. The exception handler chosen is said to catch the exception. If the run time system exhaustively searches all the methods in the call stack without finding an appropriate exception handler, the thread terminates. A method can catch an exception by providing an exception handler for that type of exception. One type of exception handler is the "catch" handler.

The first step in constructing an exception handler is to enclose the statements that might throw an exception within a "try" block. Exception handlers are associated with a "try" block by providing one or more "catch" blocks directly after the "try" block. Each "catch" block is an exception handler and handles the type of exception indicated by its argument. Exception handling may optionally include a means for cleaning up before (possibly) allowing control to be passed to a different part of the program. This can be done by enclosing the clean up code within a "finally" block. Java's "finally"

block provides a mechanism that allows a method to clean up after itself regardless of what happens within the try block. Typically, the "finally" block is used to close files or release other system resources.

To further understand the above discussion, below is example pseudo code for a method called "exampleMethod." This method receives an integer parameter, adds 1 to the integer parameter, and returns the sum:

```
public int
exampleMethod (int x)
{
  return x+1;
}
```

The present invention will instrument this code, conceptually, by including a call to a tracer method, grouping the original instructions from the method in a "try" block and adding a "finally" block with a code that stops the tracer:

```
public int
exampleMethod (int x)
{
  IMethodTracer tracer=AMethodTracer.loadTracer(
    "com.introscope.agenttrace.MethodTimer",
    this,
    "com.wily.example.ExampleApp",
    "exampleMethod",
    "name=Example Stat");
  try {
    return x+1;
  } finally {
    tracer.finishTrace( );
  }
}
```

IMethodTracer is an interface that defines a tracer for profiling. AMethodTracer is an abstract class that implements IMethodTracer. IMethodTracer includes the methods startTrace and finishTrace. AMethodTracer includes the methods startTrace, finishTrace, dostartTrace and dofinishTrace. The method startTrace is called to start a tracer, perform error handling and perform setup for starting the tracer. The actual tracer is started by the method doStartTrace, which is called by startTrace. The method finishTrace is called to stop a tracer, and to perform overhead and error handling. The method finishTrace calls doFinishTrace to actually stop the tracer. Within AMethodTracer, startTrace and finishTrace are final and void methods; and doStartTrace and doFinishTrace are protected, abstract and void methods. Thus, the methods doStartTrace and do FinishTrace must be implemented in subclasses of AMethodTracer. Each of the subclasses of AMethodTracer implement the actual tracers (e.g., timer, counter, etc.). The method loadTracer is a static method that calls startTrace and includes five parameters. The first parameter, "com.introscope . . . " is the name of the class that is intended to be instantiated that implements the interface (e.g., the timer, which is a subclass of AMethodTracer). The second parameter, "this" is the object being traced. The third parameter "com.wily.example . . . " is the name of the class that the current instruction is inside of. The fourth parameter, "exampleMethod" is the name of the method of the current instruction is inside of. The fifth parameter, "name= . . . " is the name to record the statistics under. The original instruction (return x+1) is placed inside a "try" block. The code for stopping the tracer (a call to the static method tracer.finishTrace) is put within the finally block.

The above example shows source code being instrumented. In one embodiment, the present invention doesn't actually modify source code. Rather, the present invention modifies object code. The source code examples above are used for illustration to explain the concept of the present invention. The object code is modified conceptually in the same manner that source code modifications are done above. That is, the object code is modified to add the functionality of the "try" block and "finally" block.

In one embodiment of the present invention, the system will add code to the existing object code to detect the start of a first method. The detection of the start of the method causes the starting of a countdown timer. If the first method ends (or exits), the end of the first method will be detected and the timer will be terminated. If the first method does not end in a reasonable amount of time, the timer will reach zero and set off an alarm. Upon receiving an alarm, the system will conclude that the first method is lost. A lost method will be reported to the user. In one implementation, the system will cease capturing profiling information for the lost method. In one implementation, the end of the method is detected by code in the "finally" block, with the original code in the "try" block.

Figure 2:
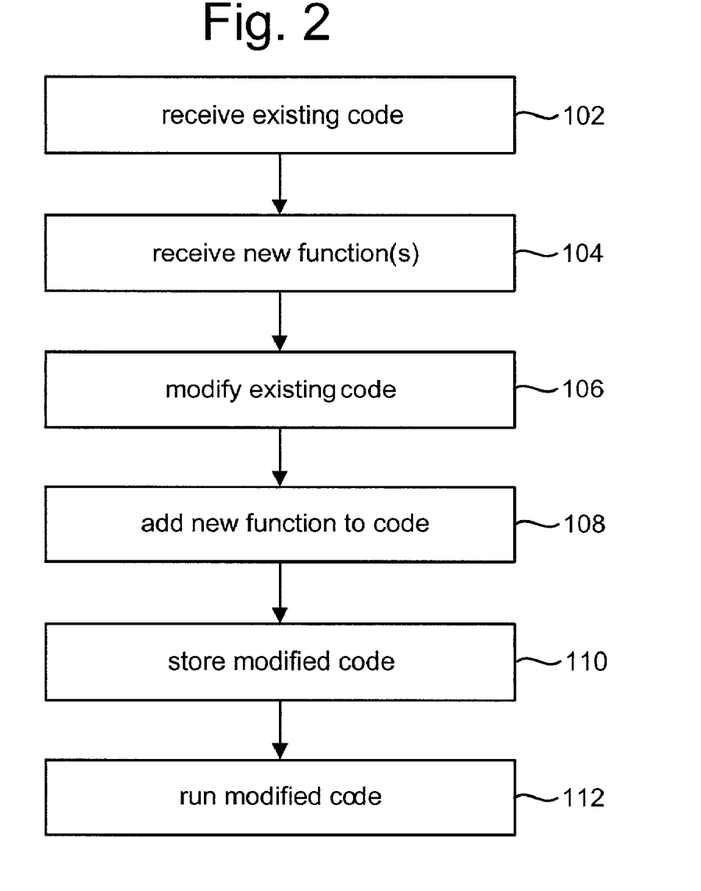
FIG. 2 is a flow chart describing one embodiment of the present invention.

FIG. 2 is a flow chart depicting a process performed by the present invention to modify the existing object code and add the new functionality. In step 102, code modifier 10 receives the existing object code. In step 104, code modifier 10 receives the new functionality. In step 106, the existing object code is modified. In step 108, all or part of the new functionality is added to the code. In step 110, the modified code (which includes the new functionality) is stored. In step 112, the modified code is run. In one embodiment, step 112 includes running a software application with the performance profile tool. In embodiments that use functionality other than a performance profiler tool, step 112 includes executing that other functionality with the original application.

Figure 3:
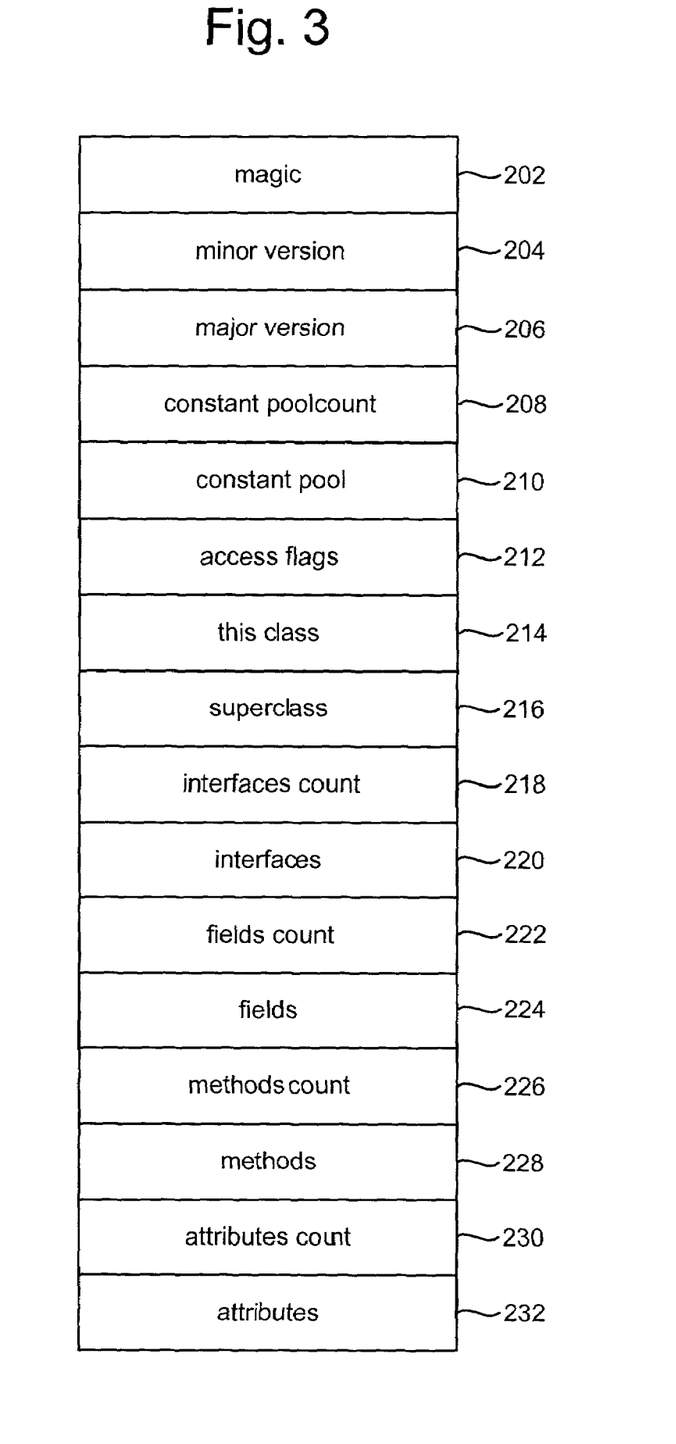
FIG. 3 depicts a symbolic representation of a class data structure.

As described above, step 102 includes receiving the existing object code. In one embodiment, the received code is stored in a class data structure according to the Java Virtual Machine Specification. FIG. 3 is a symbolic representation of the class data structure which holds the code for a class. The term code is used to refer to all of the instructions, variables, definitions, pointers, addresses etc, that are stored in a class file and/or a class data structure. Magic item 202 supplies the magic number identifying the class file. The values of the minor version 204 and major version 206 items are the minor and major version numbers of the compiler that produced the class file. Constant pool count item 208, which must be greater than zero, provides the number of entries in the constant pool. The constant pool entry at index zero is included in the count but is not present in the constant pool. A constant pool index is considered valid if it is greater than zero and less than constant pool count 208. Constant pool 210 is a table of variable length structures representing various string constants, class names, field names, integers, floating point numbers and other constants that are referred to within the class file structure and its substructures. Each of the constant pool entries at indices 1 through constant pool count−1 is a variable-length structure whose format is indicated by its first "tag" byte.

The value of access flags item 214 is a mask of modifiers used with class and interface declarations. The access flags modifiers are public, final, super, interface and abstract. The value of this class item 214 must be a valid index into the constant pool table. The constant pool entry at that index must be a CONSTANT_Class_info structure representing the class or interface defined by this class file. For a class, the value of superclass item 216 either must be zero or must be a valid index into the constant pool. If the value of the superclass item is nonzero, the constant pool entry at that index must be a CONSTANT_Class_info structure representing the superclass of the class defined by this class file. Neither the superclass nor any of its superclasses may be a final class. If the value of a superclass item is zero, then this class file must represent the class java.lang.Object, the only class or interface without a superclass.

The value of interfaces count item 218 provides the number of direct superinterfaces of this class or interface type. Each value in the interfaces array 220 must be a valid index into the constant pool. The constant pool entry at each value of interfaces[i], where 0≦i<interfaces count, must be a CONSTANT_Chass_info structure representing an interface which is a direct superinterface of this class or interface type. The value of the fields count item 222 provides the number of field_info structures in the fields table 224. The field_info structures represent all fields, both class variables and instance variables, declared by this class or interface type. Each value in the fields must be a variable-length field_info structure giving a complete description of a field in the class or interface type. The fields table includes only those fields that are declared by this class or interface. It does not include item fields that are inherited from superclasses or superinterfaces.

The value of methods count item 226 provides the number of method_info structures in methods table 228. Each entry in methods table 228 must be a variable-length method_info structure providing a complete description of the Java Virtual Machine code for a method in the class or interface. The method_info structures represent all methods, both instance methods and, for classes, class (static) methods, declared by this class or interface type.

The value of the attributes count item 230 provides the number of attributes in attributes table 232. Each entry in attributes table 232 must be a variable-length attribute structure. A class data structure can have any number of attributes associated with it. More information about ClassFile formats and the Java Virtual Machine can be found in The Java Virtual Machine Specification, Tim Lindholm and Frank Yellin, Addison-Wesley, 1997, incorporated herein by reference.

All constant pool entries have the following general format:

cp_info {
  tag;
  info[0 ];
}

Each item in the constant pool must begin with a 1-byte tag indicating the type of cp_info entry. The contents of the info array varies with the value of the tag. The valid tags and their values are CONSTANT_Class, CONSTANT_Fieldref, CONSTANT_Methodref, CONSTANT_InterfaceMethodref, CONSTANT_String, CONSTANT_Integer, CONSTANT_Float, CONSTANT_Long, CONSTANT_Double, CONSTANT_NameAndType, CONSTANT_Utf8. The following discussion explains the different types of constant pool entries.

The CONSTANT_Class_info structure is used to represent a class or an interface:

CONSTANT_Class_info }
  u1 tag;
  u2 name_index;
}

The tag item has the value CONSTANT_Class. The value of the name_index item must be a valid index into the constant pool. The constant pool entry at that index must be a CONSTANT_Utf8_info structure representing a valid fully qualified Java class name that has been converted to the class file's internal form. The values u1, u2 and u4 represent an unsigned done, two or four byte quantities, respectively.

Fields, methods, and interface methods are represented by similar structures:

CONSTANT_Fieldref_info {
  u1 tag;
  u2 class_index;
  u2 name_and_type_index;
}
CONSTANT_Methodref_info {
  u1 tag;
  u2 class_index;
  u2 name_and_type_index;
}
CONSTANT_InterfaceMethodref_info {
  u1 tag;
  u2 class_index;
  u2 name_and_type_index;
}

The tag item of a CONSTANT_Fieldref_info structure has the value CONSTANT_Fieldref. The tag item of a CONSTANT_Methodref_info structure has the value CONSTANT_Methodref. The tag item of a CONSTANT_InterfaceMethodref_info structure has the value CONSTANT_InterfaceMethodref.

The value of the class_index item must be a valid index into the constant pool. The constant pool entry at that index must be a CONSTANT_Class_info structure representing the class or interface type that contains the declaration of the field or method.

The value of the name_and_type_index item must be a valid index into the constant pool. The constant pool entry at that index must be a CONSTANT_NameAndType_info structure. This constant pool entry indicates the name and descriptor of the field or method.

The CONSTANT_String_info structure is used to represent constant objects of the type java.lang.String:

CONSTANT_String_info {
  u1 tag;
  u2 string_index;
}

The tag item of the CONSTANT_String_info structure has the value CONSTANT_String. The value of the string_index item must be a valid index into the constant pool. The constant pool entry at that index must be a CONSTANT_Utf8_info structure representing the sequence of characters to which the java.lang.String object is to be initialized.

The CONSTANT_Integer_info and CONSTANT_Float_info structures represent four-byte numeric (int and float) constants:

CONSTANT_Integer_info {
  u1 tag;
  u4 bytes;
}
CONSTANT_Float_info {
  u1 tag;
  u4 bytes;
}

The tag item of the CONSTANT_Integer_info structure has the value CONSTANT_Integer. The tag item of the CONSTANT_Float_info structure has the valueCONSTANT_Float. The bytes item of the CONSTANT_Integer_info structure contains the value of the int constant. The bytes of the value are stored in big-endian (high byte first) order. The bytes item of the CONSTANT_Float_info structure contains the value of the float constant in IEEE 754 floating-point "single format" bit layout. The bytes of the value are stored in big-endian (high byte first) order, and are first converted into an int argument.

The CONSTANT_Long_info and CONSTANT_Double_info represent eight-byte numeric (long and double) constants:

```
CONSTANT_Long_info {
    u1 tag;
    u4 high_bytes;
    u4 low_bytes; }
CONSTANT_Double_info {
    u1 tag;
    u4 high_bytes;
    u4 low_bytes;
}
```

All eight-byte constants take up two entries in the constant pool. If a CONSTANT_Long_info or CONSTANT_Double_info structure is the item in the constant pool at index n, then the next valid item in the pool is located at index n+2. The constant pool index n+1 must be considered invalid and must not be used.

The tag item of the CONSTANT_Long_info structure has the value CONSTANT_Long. The tag item of the CONSTANT_Double_info structure has the value CONSTANT_Double. The unsigned high_bytes and low_bytes items of the CONSTANT_Long structure together contain the value of the long constant ((long)high_bytes<<32)+low_bytes, where the bytes of each of high_bytes and low_bytes are stored in big-endian (high byte first) order. The high_bytes and low_bytes items of the CONSTANT_Double_info structure contain the double value in IEEE 754 floating point "double format" bit layout. The bytes of each item are stored in big-endian (high byte first) order.

The CONSTANT_NameAndType_info structure is used to represent a field or method, without indicating which class or interface type it belongs to:

```
CONSTANT_NameAndType_info {
    u1 tag;
    u2 name_index;
    u2 descriptor_index;
}
```

The tag item of the CONSTANT_NameAndType_info structure has the value CONSTANT_NameAndType. The value of the name_index item must be a valid index into the constant pool. The constant pool entry at that index must be a CONSTANT_Utf8_info structure representing a valid Java field name or method name. The value of the descriptor_index item must be a valid index into the constant pool. The constant_pool entry at that index must be a CONSTANT_Utf8_info structure representing a valid Java field descriptor or method descriptor.

The CONSTANT_Utf8_info structure is used to represent constant string values:

```
CONSTANT_Utf8_info {
    u1 tag;
    u2 length;
    bytes [length];
}
```

The tag item of the CONSTANT_Utf8_info structure has the value CONSTANT_Utf8. The value of the length item gives the number of bytes in the bytes array (not the length of the resulting string). The strings in the CONSTANT_Utf8_info structure are not null-terminated.

Each field is described by a variable-length field_info structure. The format of this structure is

```
field_info {
    u2 access_flags;
    u2 name_index;
    u2 descriptor_index;
    u2 attributes_count;
    attribute_info attributes
        [attributes_count];
}
```

The value of the access_flags item is a mask of modifiers used to describe access permission to and properties of a field. The access_flags modifiers are public, private, protected, static, final, volatile and transient.

The value of the name_index item must be a valid index into the constant pool. The constant pool entry at that index must be a CONSTANT_Utf8_info structure which must represent a valid Java field name. The value of the descriptor_index item must be a valid index into the constant pool. The constant pool entry at that index must be a CONSTANT_Utf8 structure which must represent a valid Java field descriptor. The value of the attributes_count item indicates the number of additional attributes of this field. Each value of the attributes table must be a variable-length attribute structure. A field can have any number of attributes associated with it.

Each method is described by a variable-length method_info structure. The structure has the following format:

```
method_info {
    u2 access_flags;
    u2 name_index;
    u2 descriptor_index;
    u2 attributes_count;
    attribute_info attributes
        [attributes_count];
}
```

The value of the access_flags item is a mask of modifiers used to describe access permission to and properties of a method. The access_flags modifiers are public, private, protected, static, final, synchronized, native and abstract. The value of the name_index item must be a valid index into the constant pool. The constant pool entry at that index must be a CONSTANT_Utf8_info structure representing a valid Java method name. The value of the descriptor_index item must be a valid index into the constant pool. The constant pool entry at that index must be a CONSTANT_Utf8_info structure representing a valid Java method descriptor. The value of the attributes_count item indicates the number of additional attributes of this method. Each value of the attributes table must be a variable-length attribute structure. A method can have code attributes and exception attributes.

Attributes have the following general format:

```
attribute_info {
    u2 attribute_name_index;
    u4 attribute_length;
    u1 info [attribute_length];
}
```

The attribute_name_index must be a valid unsigned 16 bit index into the constant pool of the class. The constant pool entry at the attribute_name_index must be a CONSTANT_Utf8_info structure representing the name of the attribute. The value of the attribute_length item indicates the length of the subsequent information in bytes. The length does not include the initial 6 bytes that contain the attribute_name_index and attribute_length items.

The Java virtual machine recognizes code and exception attributes for a method_info structure. The Code attribute is a variable-length attribute used in the attributes table of method_info structures. A Code attribute contains the Java virtual machine instructions and auxiliary information for a single Java method, instance initialization method or class interface initialization method. Every Java virtual machine implementation must recognize code attributes. There must be exactly one Code attribute in each method_info structure.

The Code attribute has the following format:
Code_attribute {
    u2 attribute_name_index;
    u4 attribute_length;
    u2 max_stack;
    u2 max_locals;
    u4 code_length
    u1 code[code_length];
    u2 exception_table_length;
    { u2 start_pc;
        u2 end_pc;
        u2 handler_pc;
        u2 catch_type;
    } exception_table
    [exception_table_length];
    u2 attributes_count;
    attribute_info attributes
    [attributes_count];

The attribute_name_index must be a valid index into the constant pool table. The constant pool entry at the index must be a CONSTANT_Utf8_info structure representing the string "Code." The value of the attribute_length item indicates the length of the attribute, excluding the initial six bytes. The value of the max_stack item gives the maximum number of words on the operand stack at any point during execution of this method. The value of the max_locals item gives the number of local variables used by this method, including the parameters passed to the method on invocation. The index of the first local variable is 0. The value of the code_length item gives the number of bytes in the code array for this method. The code array stores the actual bytes of code that implement the method. The exception_table_length provides the number of entries in the exception_table.

Each entry in the exception_table array describes one exception handler in the code array. Each exception_table entry contains the following items: start_pc, end_pc, handler_pc and catch_type. The values of start_pc and end_pc indicate the ranges in the code array at which the exception handler is active. The value of start_pc must be a valid index into the code array of the opcode of an instruction. The value of end_pc must be a valid index into the code array of the opcode of an instruction, or must be equal to code_length, the length of the code array. The value of start_pc must be less than the value of end_pc. Start_pc is inclusive and end_pc is exclusive. The value of handler_pc indicates the start of the exception handler code, is a valid index into the code array, is the index of the opcode of an instruction, and is less than the value of code_length. If the value of catch_type is not 0, then catch_type must be a valid index into the constant pool table. The constant pool entry at that index must be a CONSTANT_Class_info structure representing a class of exceptions that this exception handler is designed to catch. This class must be the class Throwable or one of the subclasses. The exception handler will be called only if the thrown exception is an instance of the given class or one of its subclasses. If the value of the catch type item is 0, this exception handler is called for all exceptions—this is used to implement "finally." The value of the attributes_count item indicates the number of attributes in the code attribute. Each value of the attributes table must be a variable-length structure.

The Exceptions attribute is a variable-length attribute used in the attributes table of a method_info structure. The Exceptions attribute indicates which checked exceptions a method may throw. There must be exactly one exceptions attribute in each method_info structure. The exceptions attribute has the following format:
Exceptions_attribute {
    u2 attribute_name_index;
    u4 attribute_length;
    u2 number_of_exceptions;
    U2 exception_index_table
    [number_of_exceptions];

The value of attribute_name_index must be a valid index into the constant pool table. The constant pool entry at that index must be a CONSTANT_Utf8_info structure representing the string "Exceptions." The value of the attribute_length item indicates the attribute length, including the initial 6 bytes. The value of the number_of_exceptions item indicates the number of entries in the exception_index_table. Each non-zero value in the exception_index_table array must be a valid index into the constant pool to a CONSTANT_Class_info structure representing a class type that this method is prepared to throw.

The class file structure of FIG. 3 described above is the structure that is modified in steps 106 and 108 of FIG. 2. Specifically, at least the code array of the code_attribute is modified, the exception_table_length is modified and the exception table is modified, as described below. Formats and file structures other than that depicted in FIG. 3 can also be used.

Figure 4:
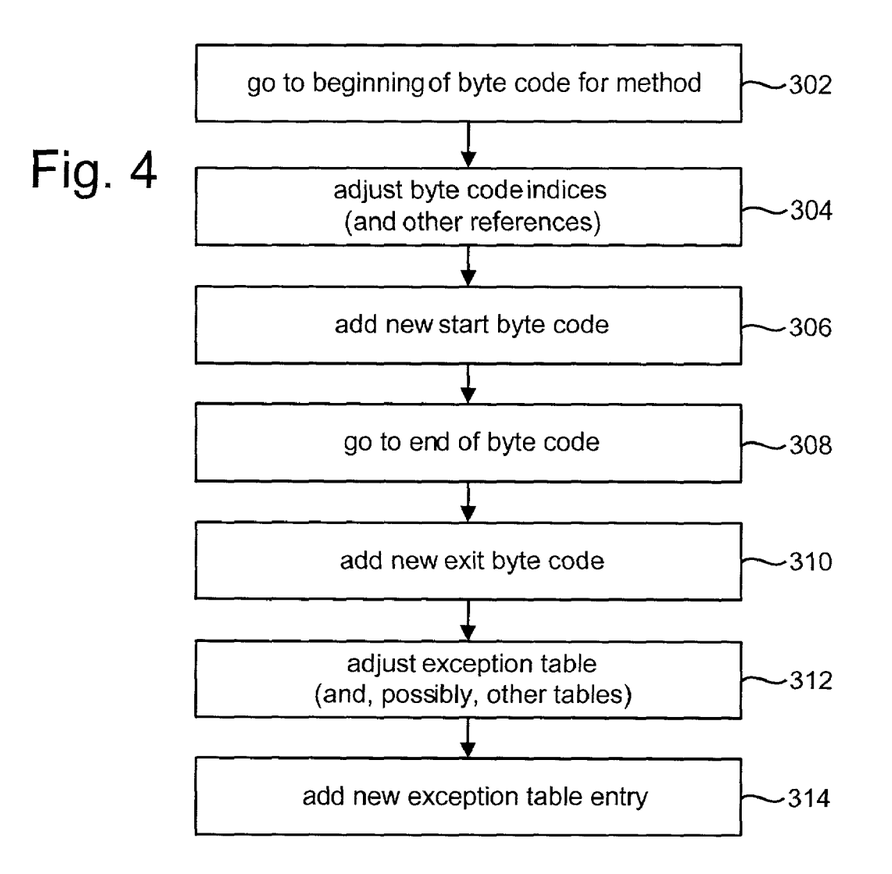
FIG. 4 is a flow chart describing one embodiment of the process of modifying existing object code.

FIG. 4 is a flowchart describing the process of modifying the existing object code (step 106) and adding new function to the code (step 108 of FIG. 2). The process of FIG. 4 is performed for one method on a data structure like that of FIG. 3. The process of FIG. 4 would be repeated for each method that needs to be instrumented. In other embodiments, the process of FIG. 4 can operate on data structures other than that of FIG. 3.

In step 302 of FIG. 4, the system accesses the beginning of the byte code for a particular method. In one implementation, step 302 includes accessing the first element in the code array of the code_attribute of the method_info structure. In step 304, the indices for the byte code are adjusted. That is, the system knows it needs to add the start code and knows how many bytes the start code occupies. These bytes will eventually be added to the top of the array. Therefore, the remaining instructions need to be moved (change index) to make room for the new instructions. If the start code needs 8 bytes, then the indices for the original code needs to be adjusted to reflect the displacement by 8 bytes. Additionally, all references to byte code within an instruction must also be adjusted; for example, the pointer reference for a jump or branch instruction must be adjusted. In step 306, the new start code is added to the code array. As discussed above, the example discussed herein is using Java byte code. Thus, step 306 includes adding new Java byte code to the beginning of the code array. In step 308, the system accesses the end of the byte code, which in one embodiment is the end of the code array. In step 310, the new exit byte code is added at the end of the code array. In some embodiments, a portion of the exit byte code is added at other points in the code array. Additionally, other alternatives include adding the exit byte code at locations other than the end of the byte code.

In step 312 of FIG. 4, the exception table is adjusted. That is, because the indices of the byte codes changed, the values of start_pc, end_pc and handler_pc may need change for existing exception handler. As described above, each entry in the exception table indicates a range of code in the code array that pertain to the particular exception handler. Because the code indices were shifted, the indices in the exception table must also shift accordingly. If the location of the exception handler code moved in the code array, then handler_pc must also change accordingly. Step 312 can also include adjusting other tables in the class file, as appropriate to the particular implementation. In one embodiment, other tables that need to be adjusted can be removed.

In step 314, a new entry is added to the exception table. This new entry correlates to the new "finally" block. The new entry has a catch_type of zero, indicating it is for all exceptions. Additionally, the new entry in the exceptions table will be added to the end of the exceptions table. The start_pc and end_pc the new entry would be set to include the original Jave byte code for the method being instrumented. The value of the handler_pc for the new entry would point to the new byte code added in step 310.

Figure 5:
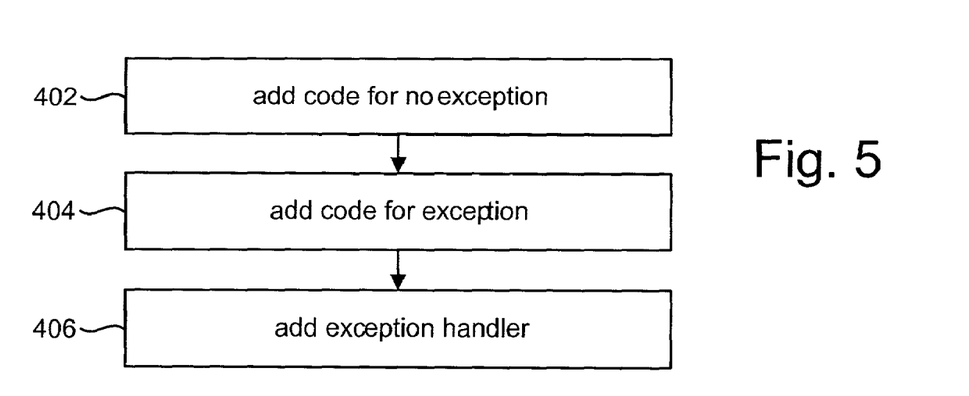
FIG. 5 is a flow chart describing one embodiment of the process of adding new exit byte code.

FIG. 5 is a flowchart describing more detail of the process of adding new exit byte code (step 310 of FIG. 4). In step 402, new code is added to the code array to account for the situation where there is no exception. That is, the original Java method instructions are performed without any exceptions. After the original instructions are performed, the new exception handler code must be executed. The original code is instrumented to include a jump to the byte code for the exception handler corresponding to the "finally" block. In step 404, new byte code is added to the code array that accounts for the situation when there are exceptions. In step 406, the code for the exception handler is added.

To better understand the present invention, an example is provided. This example explains one embodiment for performing the present invention. Described above is example pseudo code for "exampleMethod." Below is the pseudo object code (converted to a human readable form) for exampleMethod (which does not have an exceptions table):

Max stack size: 2
Max local variables: 2
Code size: 4
    0 iload_1
    1 iconst_1
    2 iadd
    3 ireturn The pseudo object code for exampleMethod includes four instructions. The first instruction (iload_1) pushes the parameter x onto the stack. The second instruction (iconst_1) pushes a constant (1) onto the stack. The third instruction (iadd) adds the top two quantities on the stack. The fourth instruction returns whatever is on top of the stack, which in this case is the sum from the previous instruction. The code above is an example of the existing object code that would be an input to code modifier 10. In one example, code modifier 10 modifies this existing object code as follows:

Max stack size: 9
Max local variables: 6
Code size: 48
    0 ldc #42 <String
       "com.wily.introscope.agent.trace.MethodTimer">
    2 aload_0
    3 ldc #56 <String "com.wily.example.ExampleApp">
    5 ldc #58 <String "exampleMethod">
    7 ldc #60 <String "name=Example Stat">
    9 invokestatic #48 <Method
    com.wily.introscope.agent.trace.IMethodTracer
    com.wily.introscope.agent.trace.AMethodTracer.
    loadTracer(java.lang.String, java.lang.Object,
    java.lang.String, java.lang.String,
    java.lang.String)>
    12 astore 4
    14 nop
    15 nop
    16 iload_1
    17 iconst_1
    18 iadd
    19 istore 5
    21 jsr 36
    24 iload 5
    26 nop
    27 ireturn
    28 astore_3
    29 jsr 36
    32 aload_3
    33 athrow
    34 nop
    35 nop
    36 astore_2
    37 aload 4
    39 invokeinterface (args 1) #54
       <InterfaceMethod
       void IMethodTracer_finishTrace( )>
    44 ret 2
    46 nop
    47 nop

| Exception Table | | | |
| --- | --- | --- | --- |
| start_pc | end_pc | handler_pc | catch_type |
| 16 | 28 | 28 | 0 |

Code modifier 10 modified the original object code to add start code and exit code. The first section of the modified code, identified by indices 0-15, corresponds to the source code "IMethodTracer tracer=AMethodTracer.loadTracer( . . . parameter . . . )." These byte codes push the parameters, call AMethodTracer.loadTracer, and store the result in a local variable. The nops at the end are just to make coding easier. In one embodiment, the longest sequence needed to generate is 16 bytes long. In one implementation, the code modifier always adds 16 bytes. Sometimes not all 16 bytes are used, so the code is padded with nops.

Section two of the modified code corresponds to instructions with indices 16, 17 and 18. These three instructions correspond to existing object code for implementing "x=x+1."

The third section of the modified code corresponds to instructions from indices 19-27 and is performed in the case where there is no exception. This code calls the "finally handler." Basically, the code of the third section sets aside the computed value (puts it into a temporary, here, local number 5). The code then jumps to the finally handler (jsr 36). When control returns back from the finally handler, the code gets the answer out of local number 5 and puts it back on the stack. Then, it returns.

Section four corresponds to code with indices 28-35. This is the "catch all exceptions" handler. Any exceptions not otherwise handled would jump to this code. This code jumps to the "finally handler" (jsr 36). This sequence of instructions saves the pending exception object, jumps to the "finally handler," restores the pending exception object, and then re-throws the pending exception object.

Section five of the code, corresponding to indices 36-47, represents the "finally handler" itself. This code stores its own return address, loads the tracer out of local 4 (where it put it back at index 12), calls the finish trace handler, and returns back to where it came from.

The example above also includes an exception table which has one entry. This entry indicates that for code between indices 16 and 28, if there is any type of exception go to the handler starting at index 28. Note that instruction 28 is the "catch all exceptions handler" described above.

Note that ranges of instructions protected by two different exception handlers always are either completely disjoint, or else one is a subrange of the other. If there are multiple entries in the exception table, the first, innermost, applicable exception handler in the exception table is chosen to handle the exception. The code for that exception handler performs its intended function and then makes a subroutine call to the "finally handler."

Figure 6:
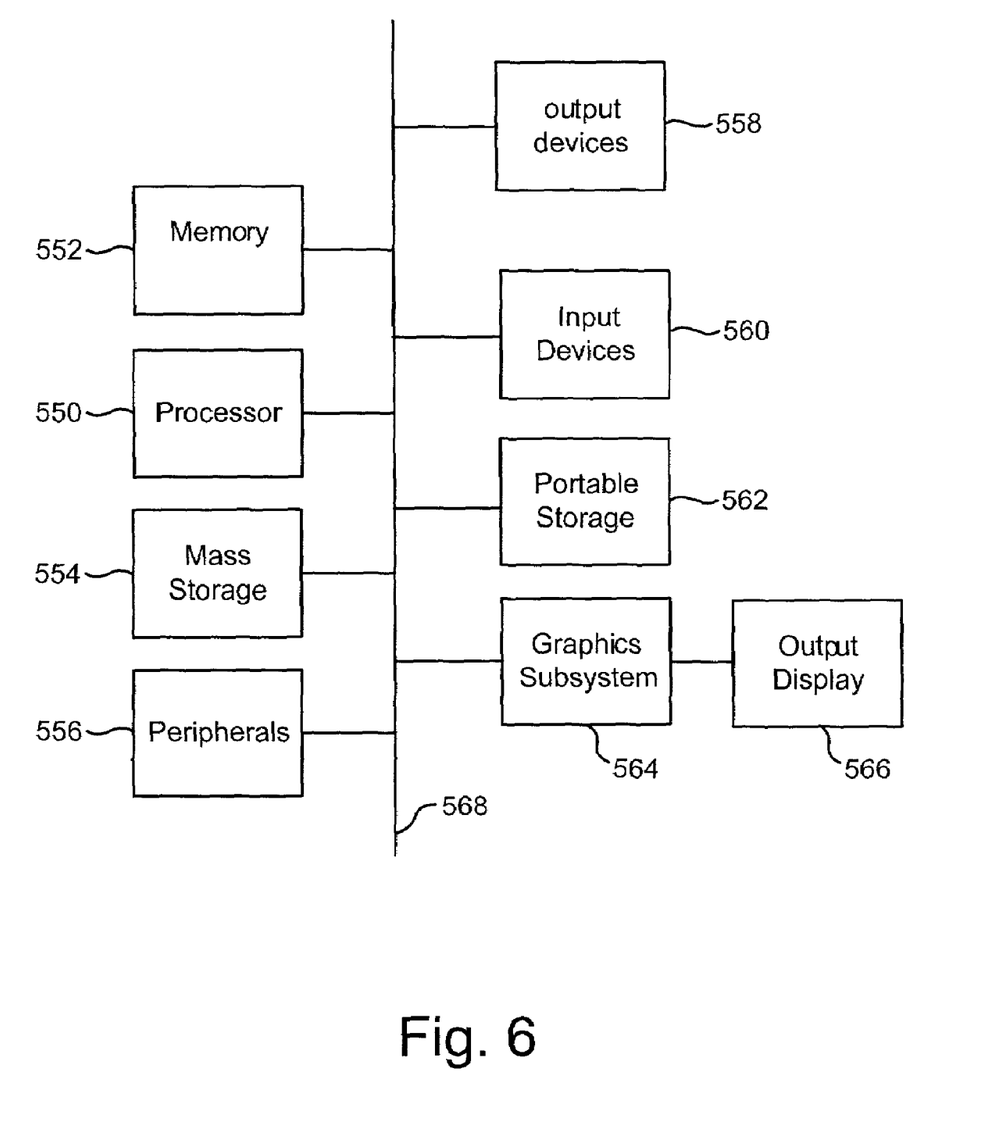
FIG. 6 is a block diagram of one embodiment of a computing system that can be used with the present invention.

FIG. 6 illustrates a high level block diagram of a computer system which can be used for various components of the present invention. The computer system of FIG. 6 includes a processor unit 550 and main memory 552. Processor unit 550 may contain a single microprocessor, or may contain a plurality of microprocessors for configuring the computer system as a multi-processor system. Main memory 552 stores, in part, instructions and data for execution by processor unit 550. If the system of the present invention is a wholly or partially implemented in software, main memory 552 can store the executable code when in operation. Main memory 552 may include banks of dynamic random access memory (DRAM) as well as high speed cache memory.

The system of FIG. 6 further includes a mass storage device 554, peripheral device(s) 556, user input device(s) 560, output devices 558, portable storage medium device(s) 562, a graphics subsystem 564 and an output display 566. For purposes of simplicity, the components shown in FIG. 6 are depicted as being connected via a single bus 568. However, the components may be connected through one or more data transport means. For example, processor unit 550 and main memory 552 may be connected via a local microprocessor bus, and the mass storage device 554, peripheral device(s) 556, portable storage medium drive(s) 562, and graphics subsystem 64 may be connected via one or more input/output (I/O) buses. Mass storage device 554, which may be implemented with a magnetic disk drive or an optical disk drive, is a non-volatile storage device for storing data and instructions for use by processor unit 550. In one embodiment, mass storage device 554 stores the system software for implementing the present invention for purposes of loading to main memory 552.

Portable storage medium drive 562 operates in conjunction with a portable non-volatile storage medium, such as a floppy disk, to input and output data and code to and from the computer system of FIG. 6. In one embodiment, the system software for implementing the present invention is stored on such a portable medium, and is input to the computer system via the portable storage medium drive 562. Peripheral device(s) 556 may include any type of computer support device, such as an input/output (I/O) interface, to add additional functionality to the computer system. For example, peripheral device(s) 556 may include a network interface for connecting the computer system to a network, a modem, a router, etc.

User input device(s) 560 provides a portion of a user interface. User input device(s) 560 may include an alpha-numeric keypad for inputting alpha-numeric and other information, or a pointing device, such as a mouse, a trackball, stylus, or cursor direction keys. In order to display textual and graphical information, the computer system of FIG. 6 includes graphics subsystem 564 and output display 566. Output display 566 may include a cathode ray tube (CRT) display, liquid crystal display (LCD) or other suitable display device. Graphics subsystem 564 receives textual and graphical information, and processes the information for output to display 566. Additionally, the system of FIG. 6 includes output devices 558. Examples of suitable output devices include speakers, printers, network interfaces, monitors, etc.

The components contained in the computer system of FIG. 6 are those typically found in computer systems suitable for use with the present invention, and are intended to represent a broad category of such computer components that are well known in the art. Thus, the computer system of FIG. 6 can be a personal computer, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method implemented on one or more machines for adding functionality to existing object code, the method comprising:
    adding exit code to said existing object code, said existing object code includes a method having original byte code, said exit code is part of a profiling process;
    adding a new entry in an exceptions data store for said existing object code, said new entry points to said exit code, said exceptions data store is an exception table for said method, said adding a new entry in said exceptions data store includes adding said new entry into said exception table for said method, said new entry indicates a range of indices corresponding to said original byte code, said new entry includes a reference to said exit code and said new entry indicates that said new entry pertains to multiple types of exceptions; and
    performing said profiling process.

2. A method according to claim 1, wherein:
said exit code is to be performed upon exiting said method.

3. A method according to claim 1, further comprising:
creating a path to said exit code from said existing object code.

4. A method according to claim 3, wherein
said creating a path includes adding a jump instruction.

5. A method according to claim 1, further comprising:
adding start code to said existing object code.

6. A method according to claim 5, wherein:
said start code is to be performed upon starting said method.

7. A method according to claim 6, wherein:
said start code is a call to a start method;
said exit code is a call to an exit method;
said start method starts said profiling process; and
said exit method stops said profiling process.

8. A method according to claim 5, wherein:
said adding start code includes adding new byte code to said method and adjusting indices for said original byte code.

9. A method according to claim 5, wherein:
said adding start code includes adding new byte code to said method and adjusting indices for said original byte code, said new byte code is positioned to be executed prior to said original byte code.

10. A method according to claim 9, wherein:
said start code starts said profiling process;
said exit code stops said profiling process;
said exit code is positioned to be executed subsequent to said original byte code; and
said adding exit code includes adding an instruction to jump to said exit code from said original byte code; and
said new entry indicates that said new entry pertains to all types of exceptions.

11. A method according to claim 5, wherein:
said adding exit code and adding a new entry include adding try and finally functionality to said original byte code.

12. A method according to claim 1, further comprising the step of:
storing said exit code.

13. A method according to claim 1, wherein:
said adding exit code and adding a new entry add instructions to be executed upon any exit from said method.

14. A method according to claim 1, wherein:
said method is a Java method;
said exit code is Java; and
said exception table is a Java exception table for said Java method.

15. A method according to claim 1, wherein said adding exit code includes:
adding new finalization code;
adding new code that calls said new finalization code if no exceptions occur; and
adding a new exception handler, said new exception handler is performed if an otherwise unhandled exception occurs, said new exception handler calls said new finalization code.

16. A method according to claim 15, wherein:
said new entry includes a reference to said new exception handler.

17. A method according to claim 1, wherein:
said adding a new entry in an exceptions data store creates a grouping of a portion of said existing object code and references a portion of said exit code that is to be performed if an exception occurs during execution of said portion of said existing object code.

18. A method according to claim 1, wherein:
said adding a new entry in an exceptions data store comprises creating a new grouping of at least a portion of said existing object code; and
said adding exit code includes adding new finalization code for said grouping, adding new code that calls said new finalization code if no exceptions occur, and adding new code that is performed if an exception occurs, said new code that is performed if an exception occurs calls said new finalization code.

19. A method according to claim 18, wherein:
said new entry includes a reference to said grouping and a reference to said new finalization code.

20. A method according to claim 1, wherein:
said adding exit code and adding a new entry include adding try and finally functionality to said existing object code.

21. The method of claim 1, wherein said adding exit code and adding a new entry are performed automatically.

22. A method implemented on one or more machines for adding functionality to existing object code, the method comprising:
adding new exit functionality to said existing object code, said existing object code includes a method having original byte code, said new exit functionality is part of a profiling process;
creating a grouping of all or a portion of said existing object code; and
associating said grouping of said existing object code with at least a portion of said new exit functionality that is to be performed if an exception occurs during execution of said grouping of said existing object code, said associating includes adding a new entry into an exception table for said method, said new entry indicates a range of indices corresponding to said original byte code, said new entry includes a reference to said new exit functionality and said new entry indicates that said new entry pertains to multiple types of exceptions.

23. A method according to claim 22, further comprising:
adding start functionality to said existing object code.

24. A method according to claim 23, wherein:
said start functionality is to be performed upon starting said method;
said exit functionality is performed upon existing said method;
said start functionality is a call to a start method;
said exit functionality is a call to an exit method;
said start method starts said profiling process; and
said exit method stops said profiling process.

25. A method according to claim 23, wherein:
said adding start functionality includes adding new byte code to said method and adjusting indices for said original byte code, said new byte code is positioned to be executed prior to said original byte code.

26. A method according to claim 25, wherein:
said start functionality starts said profiling process;
said exit functionality stops said profiling process;
said exit functionality is positioned to be executed subsequent to said original byte code;
said adding exit functionality includes adding an instruction to jump to new exit code from said original byte code; and
said new entry indicates that said new entry pertains to all types of exceptions.

27. A method according to claim 22, wherein:
said creating a grouping and associating implement try and finally functionality.

28. A method according to claim 22, wherein:
said exit functionality is to be performed upon exiting said method.

29. A method according to claim 22, wherein:
said adding exit functionality and associating includes adding instructions to be executed upon any exit from said method.

30. A method according to claim 22, wherein:
said method is a Java method; and
said exit functionality is Java code.

31. A method according to claim 22, wherein said adding new exit functionality includes:
adding new finalization code;
adding new code that calls said new finalization code if no exceptions occur; and
adding a new exception handler, said new exception handler is performed if an otherwise unhandled exception occurs, said new exception handler calls said new finalization code.

32. A method according to claim 31, wherein:
said new entry includes a reference to said new exception handler.

33. A method according to claim 22, wherein:
said adding, creating and associating include adding try and finally functionality to said existing object code.

34. The method of claim 22, wherein said adding, creating, and associating are performed automatically.

35. One or more processor readable storage devices having processor readable code embodied on said processor readable storage devices, said processor readable code for programming one or more processors to perform a method comprising:
adding exit code to existing object code, said existing object code includes a method having original byte code, said exit code is part of a profiling process; and
adding an entry in an exceptions data store pointing to said exit code, said exceptions data store is an exception table for said method, said entry indicates that said entry pertains to two or more types of exceptions, said adding an entry in said exceptions data store includes adding a new entry into said exception table for said method, said new entry indicates a range of indices corresponding to said original byte code, said new entry includes a reference to said exit code.

36. One or more processor readable storage devices according to claim 35, wherein said method further comprises:
adding start code to said existing object code.

37. One or more processor readable storage devices according to claim 36, wherein:
said adding start code includes adding new byte code to said method and adjusting indices for said original byte code.

38. One or more processor readable storage devices according to claim 36, wherein:
said adding start code includes adding new byte code to said method and adjusting indices for said original byte code, said new byte code is positioned to be executed prior to said original byte code.

39. One or more processor readable storage devices according to claim 38, wherein:
said start code starts said profiling process;
said exit code stops said profiling process;
said exit code is positioned to be executed subsequent to said original byte code;
said adding exit code includes adding an instruction to jump to said exit code from said original byte code; and
said new entry indicates that said new entry pertains to all types of exceptions.

40. One or more processor readable storage devices according to claim 35, wherein:
said adding exit code includes adding new byte code to said method.

41. One or more processor readable storage devices according to claim 35, wherein:
said adding exit code and adding an entry add instructions to be executed upon any exit from said method.

42. One or more processor readable storage devices according to claim 35, wherein:
said method is a Java method;
said exit code is Java; and
said exceptions data store is a Java exception table for said Java method.

43. One or more processor readable storage devices according to claim 35, wherein said adding exit code includes:
adding new finalization code;
adding new code that calls said new finalization code if no exceptions occur; and
adding a new exception handler, said new exception handler is performed if an otherwise unhandled exception occurs, said new exception handler calls said new finalization code, said new entry includes a reference to said new exception handler.

44. One or more processor readable storage devices according to claim 35, wherein:
said adding an entry in an exceptions data store creates a grouping of a portion of said existing object code and references a portion of said exit code that is to be performed if an exception occurs during execution of said portion of said existing object code.

45. One or more processor readable storage devices according to claim 35, wherein:
said adding an entry in an exceptions data store comprises creating a new grouping of at least a portion of said existing object code; and
said adding exit code includes adding new finalization code for said grouping, adding new code that calls said new finalization code if no exceptions occur, and adding new code that is performed if an exception occurs, said new code that is performed if an exception occurs calls said new finalization code.

46. One or more processor readable storage devices according to claim 35, wherein:
said adding exit code and adding an entry include adding try and finally functionality to said existing object code.

47. An apparatus, comprising:
one or more storage devices; and
one or more processors in communication with said one or more storage devices, said one or more processors programmed to perform a method comprising:
adding exit code to existing object code, said existing object code includes a method having original byte code, said exit code is part of a profiling process; and
adding an entry in an exceptions data store pointing to said exit code, said exceptions data store is an exception table for said method, said adding an entry in said exceptions data store includes adding a new entry into said exception table for said method, said new entry indicates a range of indices corresponding to said original byte code, said new entry includes a reference to said exit code and said new entry indicates that said new entry pertains to multiple types of exceptions.

48. An apparatus according to claim 47, wherein said method further comprises:
adding start code to said existing object code.

49. An apparatus according to claim 48, wherein:
said adding start code includes adding new byte code to said method and adjusting indices for said original byte code.

50. An apparatus according to claim 49, wherein:
said start code starts said profiling process;
said exit code stops said profiling process;

said exit code is positioned to be executed subsequent to said original byte code;
said adding exit code includes adding an instruction to jump to said exit code from said original byte code; and
said new entry indicates that said new entry pertains to all types of exceptions.

51. An apparatus according to claim 47, wherein:
said adding exit code and adding an entry add instructions to be executed upon any exit from said method.

52. An apparatus according to claim 47, wherein:
said method is a Java method;
said exit code is Java; and
said exceptions data store is a Java exception table for said Java method.

53. An apparatus according to claim 47, wherein said adding exit code includes:
adding new finalization code;
adding new code that calls said new finalization code if no exceptions occur; and
adding a new exception handler, said new exception handler is performed if an otherwise unhandled exception occurs, said new exception handler calls said new finalization code, said new entry includes a reference to said new exception handler.

54. An apparatus according to claim 47, wherein:
said adding an entry in an exceptions data store comprises creating a new grouping of at least a portion of said existing object code; and
said adding exit code includes adding new finalization code for said grouping, adding new code that calls said new finalization code if no exceptions occur, and adding new code that is performed if an exception occurs, said new code that is performed if an exception calls said new finalization code.

55. An apparatus according to claim 47, wherein:
said adding exit code and adding an entry include adding try and finally functionality to said existing object code.

56. One or more processor readable storage devices having processor readable code embodied on said processor readable storage devices, said processor readable code for programming one or more processors to perform a method comprising:
adding exit functionality to existing object code, said existing object code includes a method having original byte code, said exit functionality is part of a profiling process;
creating a grouping of all or part of said existing object code; and
associating said exit functionality as a clean up process for said all or part of said existing object code grouped together, said associating includes adding a new entry into said exception table for said method, said new entry indicates a range of indices corresponding to said original byte code, said new entry includes a reference to said exit functionality and said new entry indicates that said new entry pertains to multiple types of exceptions.

57. One or more processor readable storage devices according to claim 56, wherein said method further comprises:
adding start functionality to said existing object code.

58. One or more processor readable storage devices according to claim 57, wherein:
said adding start functionality includes adding new byte code to said method and adjusting indices for said original byte code, said new byte code is positioned to be executed prior to said original byte code;
said start functionality starts said profiling process;
said exit functionality stops said profiling process;
said exit functionality is positioned to be executed subsequent to said original byte code;
said adding exit functionality includes adding an instruction to jump to new exit code from said original byte code; and
said new entry indicates that said new entry pertains to all types of exceptions.

59. One or more processor readable storage devices according to claim 56, wherein:
said creating a grouping and associating implement try and finally functionality.

60. One or more processor readable storage devices according to claim 56, wherein:
said adding exit functionality and associating includes adding instructions to be executed upon any exit from said method.

61. One or more processor readable storage devices according to claim 56, wherein said adding, creating, and associating are performed automatically.

62. An apparatus, comprising:
one or more storage devices; and
one or more processors in communication with said one or more storage devices, said one or more processors programmed to perform a method comprising:
adding exit functionality to existing object code, said existing object code includes a method having original byte code, said exit functionality is part of a profiling process,
creating a new grouping of all or part of said existing object code; and
associating said exit functionality as a clean up process for said all or part of said existing object code grouped together,
said creating a grouping and associating include adding a new entry into an exception table for said method, said new entry indicates a range of indices corresponding to said original byte code, said new entry includes a reference to said exit functionality and said new entry indicates that said new entry pertains to multiple types of exceptions.

63. An apparatus according to claim 62 wherein said method further comprises:
adding start functionality to said existing object code.

64. An apparatus according to claim 63, wherein:
said adding start functionality includes adding new byte code to said method and adjusting indices for said original byte code, said new byte code is positioned to be executed prior to said original byte code;
said start functionality starts said profiling process;
said exit functionality stops said profiling process;
said exit functionality is positioned to be executed subsequent to said original byte code; and
said new entry indicates that said new entry pertains to all types of exceptions.

65. An apparatus according to claim 62, wherein:
said creating a grouping and associating implement try and finally functionality.

66. An apparatus according to claim 62, wherein:
said adding exit functionality, creating a grouping and associating includes adding instructions to be executed upon any exit from said method.

67. A method implemented on one or more machines for adding functionality to existing object code, the method comprising:
accessing said existing object code; and
adding try and finally functionality to said existing object code, said adding try and finally functionality includes:

adding new finalization code;

adding new code that calls said new finalization code if no exceptions occur, adding a new exception handler, said new exception handler is performed if an otherwise unhandled exception occurs, said new exception handler calls said new finalization code, and adding a new entry in an exceptions table, said new entry includes a reference to a portion of said existing object code and a reference to said new exception handler, said new entry indicates that said new entry pertains to multiple types of exceptions.

68. The method of claim 67, wherein said accessing and adding are performed automatically.

69. One or more processor readable storage devices having processor readable code embodied on said processor readable storage devices, said processor readable code for programming one or more processors to perform a method comprising:

adding exit code to said existing object code, said existing object code includes a method having original byte code, said adding exit code includes adding start code to said existing object code, said adding start code includes adding new byte code to said method and adjusting indices for said original byte code, said new byte code is positioned to be executed prior to said original byte code, said start code starts a profiling process, said exit code stops a profiling process, said exit code is positioned to be executed subsequent to said original byte code, said adding exit code includes adding an instruction to jump to said exit code from said original byte code; and adding a new entry in an exceptions data store for said existing object code, said new entry points to said exit code, said exceptions data store is an exception table for said method, said adding a new entry in said exceptions data store includes adding said new entry into said exception table for said method, said new entry indicates a range of indices corresponding to said original byte code, said new entry includes a reference to said exit code and said new entry indicates that said new entry pertains to all types of exceptions.

70. One or more processor readable storage devices according to claim 69, wherein adding exit code includes:

adding new finalization code;

adding new code that calls said new finalization code if no exceptions occur; and adding a new exception handler, said new exception handler is performed if an otherwise unhandled exception occurs, said new exception handler calls said new finalization code, said new entry includes a reference to said new exception handler.

71. One or more processor readable storage devices according to claim 69, wherein said adding exit code and adding a new entry are performed automatically.

* * * * *

UNITED STATES PATENT AND TRADEMARK OFFICE
CERTIFICATE OF CORRECTION

PATENT NO.         : 7,512,935 B1                                          Page 1 of 1
APPLICATION NO. : 09/795901
DATED              : March 31, 2009
INVENTOR(S)        : Jeffrey R. Cobb It is certified that error appears in the above-identified patent and that said Letters Patent is hereby corrected as shown below:

Col. 17, line 14: After "code;" and before "said" delete "and"

Signed and Sealed this

Twenty-fifth Day of August, 2009

David J. Kappos
*Director of the United States Patent and Trademark Office*